United States Patent [19]

Harsdorff

[11] Patent Number: 4,884,901
[45] Date of Patent: Dec. 5, 1989

[54] BEARING WITH ANGLE ENCODING

[75] Inventor: Ortwin Harsdorff, Zell, Fed. Rep. of Germany

[73] Assignee: SKF GmbH, Schweinfurt, Fed. Rep. of Germany

[21] Appl. No.: 250,754

[22] Filed: Sep. 28, 1988

[30] Foreign Application Priority Data

Oct. 3, 1987 [DE] Fed. Rep. of Germany ....... 3733495

[51] Int. Cl.[4] .............................................. F16C 19/38
[52] U.S. Cl. ...................................... 384/448; 384/903
[58] Field of Search ............... 384/448, 903, 446, 484, 384/485, 486; 340/682

[56] References Cited

U.S. PATENT DOCUMENTS

| | | | |
|---|---|---|---|
| 4,364,615 | 12/1982 | Euler | 384/903 |
| 4,688,951 | 8/1987 | Guers | 384/448 |
| 4,732,494 | 3/1988 | Guers et al. | 384/448 |
| 4,795,278 | 1/1989 | Hayashi | 384/448 |

*Primary Examiner*—Lenard A. Footland
*Attorney, Agent, or Firm*—Rosen, Dainow & Jacobs

[57] ABSTRACT

A bearing race (1) of a bearing is provided with a sealing retention ring (6) in whose retention hole (9) a sealing ring (10) is placed. The sealing retention ringe (6) is provided with angle code means implemented, preferably, in the form of an annular gear (20) which can be scanned by a sensor (22) for recording the revolutions.

9 Claims, 1 Drawing Sheet

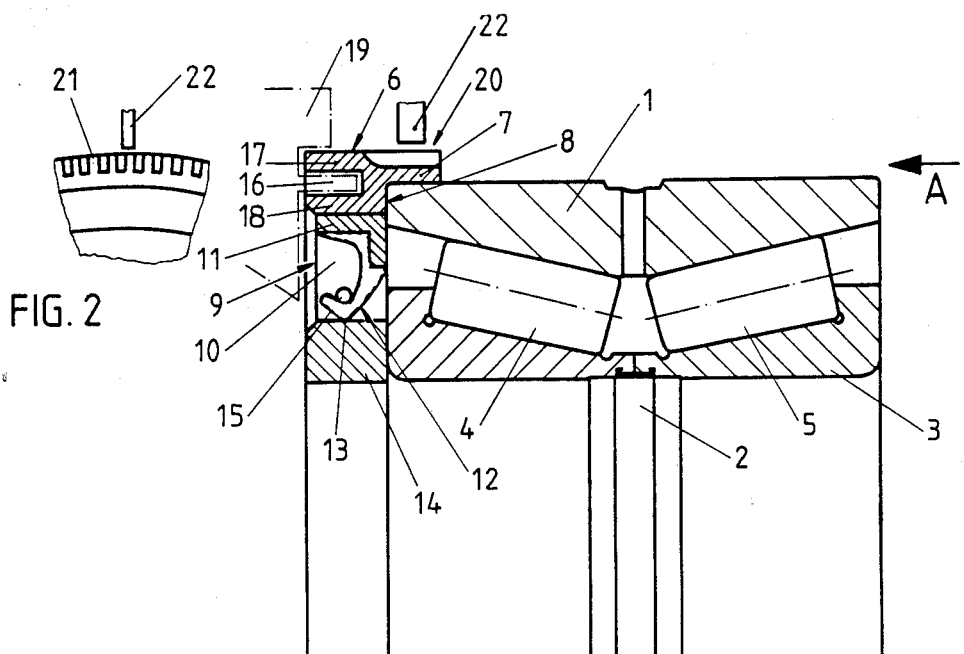
FIG. 2
FIG. 1
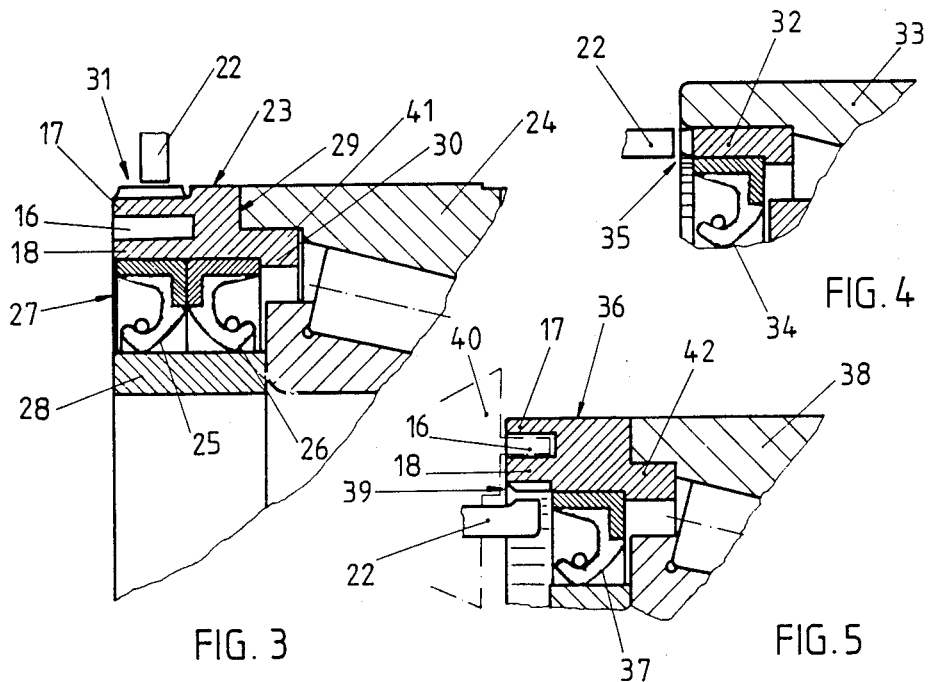
FIG. 3
FIG. 4
FIG. 5

BEARING WITH ANGLE ENCODING

The invention concerns a bearing arrangement with a sealing arrangement equipped with an angle code scannable by sensor.

BACKGROUND OF INVENTION

In certain applications the need exits to record the rotary motion of revolving parts to establish, for example, the speed, acceleration, delay or direction of rotation and to derive from these data certain control and regulating functions. Devices of this kind are used in particular in so-called antilocking systems in motor vehicles for the optimum regulating of the braking power. However, they are also used in positioning devices where a driven part must be placed precisely in a target position. Generally, this involves a step counter which turns with the rotating part and is equipped with an angle code which is scanned by a sensor and emits a signal per angle unit which is sent to a connected electrical circuit for interpretation.

A similar device for recording revolutions is known from, e.g., GB-PS 16 04 862. In that instance, a metal race—whose circumference is equipped with gear teeth—is placed on the inner race of a ball bearing. A sensor is held by an annular element attached to the outer race of the bearing in such manner that the sensor head is immediately adjacent to the teeth. The annular element which supports the sensor head is rigid and forms a labyrinth seal together with the metal annular gear, or it consists of a flexible sealing ring which has a sealing lip which slides against a smooth face of the metal annular gear. The teeth passing before the scanning head of the sensor trigger a pulse train whose frequency is a measure of the immediate angular velocity.

Although this known device combines in a single component the necessary mechanism for determining the rotary motion and a sealed bearing, it requires an additional element in the form of an annular gear, and the annular element which assumes the sealing function is a complicated—and thus expensive—component. In addition, the conditions resulting from the special design make it impossible to use commercially available and tested standard sealing rings in the bearing.

BRIEF DESCRIPTION OF INVENTION

The objective of the invention is to create a bearing of the type described above, constituting a compact unit, and meeting strenuous sealing requirements while permitting, without additional expense, universal incorporation into a variety of applications requiring the recording by a sensor of rotary motion.

This objective is met according to the invention in that a sealing retention ring, attached to a bearing race and functioning to support a sealing ring for the bearing assembly, is provided with the angle code means.

The advantages of the invention consist in particular in the fact that the part equipped with the angle code means for recording the rotary motion is not additional and is not designed exclusively for this purpose because it also serves to accommodate a sealing ring. As a result, the possibility exists to use commercially available sealing rings, greatly independent from the design of the bearing itself and from the spatial requirements for scanning the rotary motion.

If needed, longer sealing retention rings may also be used in order to provide for more than one sealing ring in case of demanding sealing requirement, e.g., for wheel bearings; in this case it is neither necessary to change the design of the bearing, nor to take special measures for scanning the rotary motion.

Similar sealing retention rings may also be used for various other bearings as long as the diameters of the bearing seats are the same; which means that the number of variations confronting the manufacturer can be kept to a minimum.

In addition, the angle coded means—implemented, for example, as an annular gear—can be adapted to different surfaces of the sealing retention ring in order to assume a favorable position vis-a-vis the sensor, according to the individual assembly conditions. Instead of an annular gear, other types of encoding, e.g., inductive, capacitive, optical or other, may, of course, also be used and involve, according to known methods, information-containing designs dependent on the angle position.

Another advantage is that, in case of a force-actuated connection between the sealing retention ring and the bearing race, a snug fit of optimum length can be provided so that notwithstanding the fact that the manufacture is inexpensive, any slipping of the sealing retention ring—and thus erroneous scanning of the angle code—is prevented, even under heavy conditions of use.

Finally, for even greater sealing requirements, the sealing retention ring may be equipped in a simple manner with sealing ridges which can be combined with a matching counterpart to form an additional labyrinth seal.

BRIEF DESCRIPTION OF DRAWINGS

The accompanying drawings show several embodiments of the invention which are explained hereafter in greater detail. The figures of the drawings show the following:

FIG. 1 shows, partly in cross-section, a first embodiment of the invention with a sealing retention ring pressed against an outer bearing race;

FIG. 2 shows a detail of the sealing retention ring according to FIG. 1;

FIG. 3 shows, partly in cross-section, a second embodiment of the invention with a sealing retention ring also pressed against an outer bearing race;

FIG. 4 shows a variation of FIG. 3; and

FIG. 5 shows a further variation of FIG. 3.

DETAILED DESCRIPTION OF PREFERRED EMBODIMENTS

FIG. 1 shows a double-row tapered roller bearing equipped with an outer bearing race 1, a two-part inner bearing race 3 made into one unit by means of an annular clamp 2, as well as two tapered roller crowns 4, 5. The left section of the figure shows a sealing retention ring 6, with an annular section 7, pressed against and fixed to the surface of the outer bearing race 1, whereby a shoulder 8 of the sealing retention ring 6 —which shoulder limits the length of the annular section 7—is frontally adjacent to the outer bearing race 1. The sealing retention ring 6 has a retention hole 9, allowing a snug fit with a suitable sealing ring 10. The latter involves a sealing ring of a commercially available type consisting of a rigid thrust collar 11 and, connected thereto, a flexible part 12 with a sealing edge 13 and a spring 15 pressing the sealing edge 13 against an axial face seal 14, which sealing ring functions to keep foreign matter out of the active bearing surfaces. In the assembled state, the axial face seal 14, like the inner bearing race 3, is attached to a shaft or spindle. The horizontal dash-dot line at the bottom of FIG. 1 represents the central axis of the bearing, about which the parts shown are symmetrical. In addition, the sealing retention ring 6 is also provided on the front side with a groove 16, thus forming sealing ridges 17, 18 which constitute a labyrinth sealing—when fitted together with a counterpart 19 on the side of the bearing for attaching parts, here shown with a dash-dot line.

On the outer peripheral surface area of the sealing retention ring 6, extending over the annular section 7, angle code means in the form of an annular gear 20 having teeth 21 has been incorporated. FIG. 2 shows in section the arrangement of the teeth 21, rendered in the direction of the arrow A. Radially across from the teeth 21, a sensor 22 has been installed with little play which operates, e.g., inductively, generating a signal with each passing tooth 21. By means of the teeth 21 passing with each time unit, with the signals generated accordingly by the sensor 22, a connected interpretation electrical circuit determines in a known manner any accelerations, delays, etc., and converts them, e.g., into control or regulation signals for drive systems or brakes. In the first embodiment shown in FIGS. 1 and 2, the outer race 1 rotates relative to the inner race 3.

FIG. 3 shows a second embodiment in which sealing retention ring 23, with an annular section 41, is pressed with a snug fit into a hole of the outer bearing race 24. The sealing retention ring 23 extends axially beyond the bearing over such a length that two sealing rings 25, 26 can be incorporated in opposite directions of operation in the retention hole 27. Though not necessary, here, too, an axial face seal 28 is provided against which the sealing rings 25, 26, rest while forming a seal. The sealing retention ring 23 is again pressed against the outer bearing race 24 as far as a shoulder 29 allows, and has, in its retention hole 27, a collar 30 serving as an axial stop for the inner sealing ring 26. Teeth 31, constituting the angle code, extend over the outside peripheral surface of the sealing retention ring 23 but do not, in this case, extend over the outer bearing race 24 as in the first embodiment, so that the design of the bearing housing does not have to take the diameter of the retention ring into account. Sensor 22 as well as groove 16—or sealing ridges 17, 18—are arranged in a manner similar to the embodiment shown in FIG. 1.

The sealing retention ring 32, in the example of a third embodiment according to FIG. 4, is again pressed against the outer bearing race 33, but this time the length allows only for one sealing ring 34, and the annular gear 36 constituting the angle code is in a frontal position. Thus, the sensor 22 can be placed axially before the bearing.

The variation rendered in FIG. 5 shows a sealing retention ring 36 for only one sealing ring 37 which is pressed, together with an annular section 42, in the outer bearing race 38 and is equipped with a groove 16 or sealing ridges 17, 18, forming a labyrinth seal; while the bore hole holds besides the sealing ring 37 the annular gear 39 constituting the angle code means. The sensor 22 reaches into the bore hole of the sealing retention ring 36 and scans rotary motions on the inside. A similar device makes sense, for example, when the teeth 39 need special protection against dirt, perhaps by means of a machine part—here indicated with a dotted line—shaped as a counterpart 40 to the sealing ridges 17, 18 and the groove 16, and forming with the latter a labyrinth seal.

While the invention has been described in connection with preferred embodiments, this is not meant to be limiting, and it will be obvious to those skilled in the art that other changes and variations are possible based on the principles described herein and are intended to be covered by the scope of the appended claims.

What is claimed is:

1. A sealed bearing arrangement having angle code means scannable by a sensor, comprising a bearing race, rolling elements in the race, at least one sealing ring for sealing off the bearing race and rolling elements against contamination, and a sealing retention ring attached to said bearing race for retaining said sealing ring on the bearing, and means on the sealing retention ring for providing the angle code means.

2. A bearing according to claim 1, characterized in that the angle code means is formed by an annular gear.

3. A bearing according to claim 2, characterized in that the annular gear is mounted on the surface or bore area of the sealing retention ring.

4. A bearing according to claim 2, characterized in that the annular gear is mounted on a frontal surface of the sealing retention ring.

5. A bearing according to claim 1, characterized in that the sealing retention ring is mounted so that it axially extends beyond the bearing race.

6. A bearing according to claim 1, characterized in that the sealing retention ring and the bearing race are forcibly pressed together by means of annular sections which overlap so as to form socket ends.

7. A bearing according to claim 6, characterized in that the sealing retention ring or the bearing race is equipped with a shoulder which limits the length of the force-actuated connection.

8. A bearing according to claim 1, characterized in that the sealing retention ring is provided at its frontal side away from the bearing race with one or more sealing ridges to form a labyrinth seal with a correspondingly shaped counterpart.

9. A bearing according to claim 1 wherein the bearing race is the outer bearing race, the sealing retention ring comprises a flexible member extending radially toward the bearing axis, an axial face seal is secured to an inner race of the bearing, the flexible member engaging and sealing to the axial face seal.

* * * * *

UNITED STATES PATENT AND TRADEMARK OFFICE
CERTIFICATE OF CORRECTION

PATENT NO. : 4,884,901

DATED : December 5, 1989

INVENTOR(S) : Ortwin Harsdorff

It is certified that error appears in the above-identified patent and that said Letters Patent is hereby corrected as shown below:

Title page, abstract, line 3, after "retention" change "ringe" to --ring--.

Column 2, line 3, change "requirement" to --requirements--.

Signed and Sealed this

Ninth Day of February, 1993

Attest:

STEPHEN G. KUNIN

Attesting Officer

Acting Commissioner of Patents and Trademarks